United States Patent

Schmitz et al.

[11] Patent Number: 5,868,108
[45] Date of Patent: Feb. 9, 1999

[54] METHOD FOR CONTROLLING AN ELECTROMAGNETIC ACTUATOR OPERATING AN ENGINE VALVE

[75] Inventors: Günter Schmitz; Franz Pischinger, both of Aachen, Germany

[73] Assignee: FEV Motorentechnik GmbH & Co. KG, Aachen, Germany

[21] Appl. No.: 989,264

[22] Filed: Dec. 11, 1997

[30] Foreign Application Priority Data

Dec. 13, 1996 [DE] Germany .................. 196 51 846.6
Jun. 4, 1997 [DE] Germany .................. 197 23 405.4

[51] Int. Cl.$^6$ ..................................................... F01L 9/04
[52] U.S. Cl. .................................. 123/90.11; 251/129.01; 251/129.16
[58] Field of Search ............... 123/90.11; 251/129.01, 251/129.02, 129.05, 129.1, 129.15, 129.16

[56] References Cited

U.S. PATENT DOCUMENTS

| | | | |
|---|---|---|---|
| 4,455,543 | 6/1984 | Pischinger et al. | 335/266 |
| 4,955,334 | 9/1990 | Kawamura | 123/90.11 |
| 5,645,019 | 7/1997 | Liang et al. | 123/90.11 |
| 5,647,311 | 7/1997 | Liang et al. | 123/90.11 |
| 5,671,705 | 9/1997 | Matsumoto et al. | 123/90.11 |
| 5,730,091 | 3/1998 | Diehl et al. | 123/90.11 |

*Primary Examiner*—Weilun Lo
*Attorney, Agent, or Firm*—Spencer & Frank

[57] ABSTRACT

A method of operating a cylinder valve of an internal-combustion engine with an electromagnetic actuator for moving the cylinder valve into opposite open and closed valve end positions includes the steps of energizing an electromagnet of the actuator for generating an electromagnetic force for moving an armature of the actuator toward a pole face of the electromagnet against the force of a return spring; after the armature enters a zone adjacent the pole face of the electromagnet, applying to the armature an additional force opposing the electromagnetic force of the electromagnet; dimensioning the additional force such that an equilibrium between the electromagnetic force of the electromagnet and the increased opposing force of the return spring is situated at a location shortly before the armature enters into engagement with the pole face of the electromagnet; and after the armature reaches the location of force equilibrium, controlling a current supply to the electromagnet such that the armature reaches the pole face of the electromagnet with a predeterminable velocity.

10 Claims, 5 Drawing Sheets

FIG. I

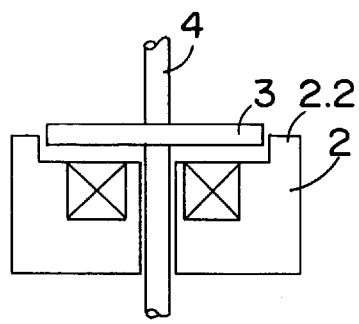
FIG. 8.1
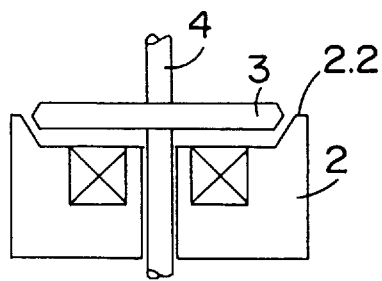
FIG. 8.2
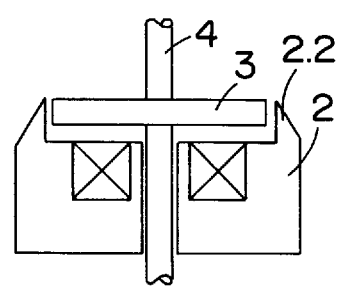
FIG. 8.3
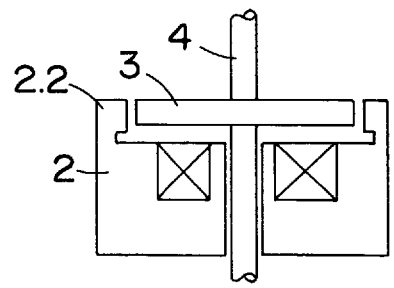
FIG. 8.4

METHOD FOR CONTROLLING AN ELECTROMAGNETIC ACTUATOR OPERATING AN ENGINE VALVE

REFERENCE TO RELATED APPLICATION

This application claims the priority of German Application Nos. 196 51 846.6 filed Dec. 13, 1996 and 197 23 405.4 filed Jun. 4, 1997, which are incorporated herein by reference.

BACKGROUND OF THE INVENTION

U.S. Pat. No. 4,455,543 describes an electromagnetic actuator for operating a cylinder valve in an internal-combustion engine. The actuator essentially is formed of two spaced electromagnets wherein the pole faces of one electromagnet are oriented towards the pole faces of the other electromagnet. In the space defined between the pole faces of the two electromagnets an armature is disposed which is coupled with the cylinder valve and which, dependent upon the alternating energization of the electromagnets, moves back and forth against the force of resetting springs. In the respective terminal position of the cylinder valve (open or closed position) the armature is in engagement with the pole face of the respective holding magnet and is maintained there as long as the holding electromagnet is in an energized state. In the position of rest the armature is in a mid position between the pole faces of the two electromagnets, determined by the force equilibrium of the two oppositely working resetting springs.

If, during operation, the armature is to be displaced from one of its end positions into the other, the holding electromagnet is de-energized so that the armature, together with the cylinder valve, is moved by the force of the associated return spring in the direction of the mid position (position of rest). Upon subsequent energization of the opposite, capturing electromagnet, the armature will be in the effective range of the magnetic field of the capturing electromagnet and is moved by means of the magnetic force against the force of the other return spring into the other end position. As the armature impacts on the pole face of the capturing electromagnet, noise is generated whose intensity is dependent from the magnitude of the impact velocity. At the same time, risks are high that the armature rebounds which, for example, upon closing the cylinder valve, may lead to a brief reopening of the valve after the latter has already been seated. By a suitable control of the energization of the momentarily capturing electromagnet it is feasible to reduce the impact velocity; yet, the impact velocity has to be at all times sufficiently high to ensure that the armature is securely captured, that is, it securely arrives into engagement with the pole face.

To minimize the unavoidable impact noises, an impact velocity of less than 0.1 m/s is required for the armature in electromagnetic valve drives of the above-outlined type. Such low impact velocities have to be ensured in all real operating conditions while taking into consideration all related stochastic fluctuations; this, however, requires a substantial circuitry outlay. In vehicle engines irregularities in the road surface or other effects in the terminal approaching phase of the armature are sufficient to cause a sudden drop of the armature in case the magnetic force is oriented precisely in the direction of force requirement which is necessary for such a minimum impact velocity. A residual noise, however, cannot be avoided.

SUMMARY OF THE INVENTION

It is an object of the invention to provide an improved method for operating an electromagnetic valve actuator from which the discussed disadvantages are eliminated.

These objects and others to become apparent as the specification progresses, are accomplished by the invention, according to which, briefly stated, the method of operating a cylinder valve of an internal-combustion engine with an electromagnetic actuator for moving the cylinder valve into opposite open and closed valve end positions includes the steps of energizing an electromagnet of the actuator for generating an electromagnetic force for moving an armature of the actuator toward a pole face of the electromagnet against the force of a return spring; after the armature enters a zone adjacent the pole face of the electromagnet, applying to the armature an additional force opposing the electromagnetic force of the electromagnet; dimensioning the additional force such that an equilibrium between the electromagnetic force of the electromagnet and the increased opposing force of the return spring is situated at a location shortly before the armature enters into engagement with the pole face of the electromagnet; and after the armature reaches the location of force equilibrium, controlling a current supply to the electromagnet such that the armature reaches the pole face of the electromagnet with a predeterminable velocity.

Dependent upon design, the armature arrives into engagement with the pole face of the capturing electromagnet with a very small velocity which may be close to zero and upon such an arrival, the energizing current of the capturing electromagnet is increased to such an extent that a sufficient holding force is generated. According to another design, the armature does not directly impinge upon the pole face of the capturing electromagnet but is captured by a suitably directed magnetic field which is so positioned that the engine valve is, at least in its closed position, held by magnetic forces.

According to an advantageous feature of the invention, the force which augments the force of the return spring is applied by a spring force. Such an embodiment represents the simplest realization of the method according to the invention because it may be effected by mechanical systems, for example, by disconnecting the two resetting springs at least in the closed position of the valve, or by means of a resetting spring characteristic which at least in the end region is progressive or by applying the force of an additional spring. The application of an additional spring force has the advantage that in the vicinity of the pole faces the armature is exposed to an increasing, defined reinforcement of the resetting force of the resetting springs, so that in cooperation with the oppositely oriented magnetic forces, the point of equilibrium may be set to the open position and, in particular, to the closed position of the engine valve purely by a mechanical arrangement, and thus not only a soft arrival of the valve in its valve seat is ensured but also, the valve is securely held against dropping.

According to a further feature of the invention, the force which increases the force of the return springs is applied by magnetic forces affecting the armature. By influencing the magnetic forces in the vicinity of the pole faces, the position of the point of equilibrium can be controlled in a very accurate manner in coordination with the spring curve (which, at least in the end region has a progressive or abruptly changing course).

According to another advantageous feature of the invention, the force which augments the effect of the return springs and which is applied to the armature is derived from a suitably configured force-displacement curve of the electromagnetic forces generated by the capturing electromagnet. With this measure the armature may be brought in a "soft" manner to the pole faces of the capturing electromagnet and may be maintained there. This may be achieved by a suitable control of the energization of the solenoid of the respective electromagnets and/or by a suitable design of the electromagnets.

In a further embodiment of the method according to the invention, for operating an engine valve which is designed for a soft arrival in its valve seat, the current supply to at least one of the two electromagnets of the electromagnetic valve actuator is so controlled and the generated electromagnetic field is so oriented that in an end position of the cylinder valve the reciprocatable armature which operates the valve is held at the electromagnet against a resetting spring force and out of contact with the pole faces of the electromagnet. In this method the armature does not impact on the pole face but is "softly" caught by an appropriately oriented magnetic field. By a suitable control of the energization of the electromagnet it is feasible to achieve a close-to-zero velocity as the armature reaches its end position. In case such an attempt is unsuccessful, the armature nevertheless may move without impacting the pole face, because the holding force and the positioning of the armature are effected exclusively by the magnetic field and the counterforce of the return spring. By virtue of an appropriate control of the energization (current supply) the magnetic field may have an excessive force which prevents an unintended "drop" of the armature in response to external force effects. Thus, even in case of a "creeping" of the armature into the end position, external impact forces cannot lead to a drop of the armature.

According to an advantageous feature of the invention, the magnetic field provided for a contactless holding of the armature is oriented substantially perpendicularly to the direction of armature motion, relatively to the end position of the armature. This is effected, for example, by providing that the respective electromagnet has two spaced pole faces which are essentially oriented towards one another. Upon release from the holding electromagnet the armature receives sufficient kinetic energy to move beyond the position of equilibrium determined by the resetting springs and it approaches the capturing electromagnet to such an extent that it arrives in the force range of the magnetic field of the capturing electromagnet and is thus continued to be moved in the direction of motion against the force of the effective return spring. As soon as the armature is situated between the two pole faces of the capturing electromagnet, the maximum magnetic force is exerted thereon so that the armature is maintained in the end position determined by those pole faces. The force of the magnetic field has to be designed such that it corresponds to the force of the compressed resetting spring.

According to a further advantageous feature of the method of the invention, upon energization of the electromagnet which holds the armature in a contactless manner, the current is reduced before the armature reaches its end position. In this manner it is possible to reduce the approaching velocity of the armature to avoid "overshooting". The energization may be controlled such that as the armature reaches its end position, the current is again increased to such an extent that the necessary holding force is exerted securely on the armature and thus an undesired armature motion triggered by outer force effects is avoided.

According to a further advantageous feature of the invention, the armature which is held in its end position in a contactless manner by the electromagnet, is additionally exposed to the force of at least one permanent magnet. The permanent magnet force is oriented in the same direction as the electromagnetic field and is of such a magnitude that it affects the armature less than the force of the associated return spring. By providing such a permanent magnetic field, the current required for holding the armature may be advantageously reduced particularly in the open position of the engine valve, because one part of the magnetic force is applied by the permanent magnet. To release the armature, the surplus force of the return spring is sufficient to overcome the force of the permanent magnet field after de-energization of the electromagnet.

BRIEF DESCRIPTION OF THE DRAWINGS

FIGS. 8.1–8.4 are schematic fragmentary side elevational views of various actuator structures illustrating different configurations of an electromagnet thereof.

DESCRIPTION OF THE PREFERRED EMBODIMENTS

Figure 1:
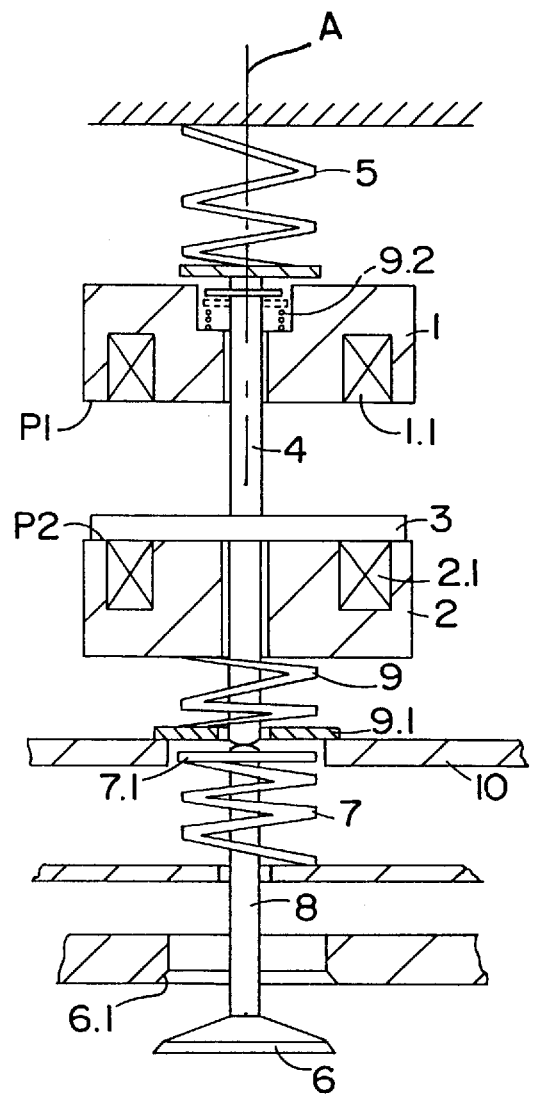
FIG. 1 is a schematic axial sectional view of an electromagnetic actuator for performing a preferred embodiment of the method according to the invention.

The electromagnetic actuator shown in FIG. 1 in a basic representation is formed essentially of two spaced electromagnets 1 and 2 functioning, respectively, as a closing magnet and an opening magnet. An armature 3 is arranged between the two electromagnets 1 and 2 for reciprocation parallel to the actuator axis A. The armature 3 is connected to a guide rod 4 which is guided in the region of the electromagnets 1 and 2.

A cylinder valve 6 operated by the electromagnetic actuator is maintained in the closed position by a closing spring 7. The cylinder valve 6 has a valve shaft 8 whose upper end is engaged by the bottom end of the guide rod 4. The upper end of the guide rod 4 is supported on a stationary component with the interposition of an opening spring 5. The opening spring 5 and the closing spring 7 affect the armature 3 via the guide rod 4 as resetting springs and exert oppositely oriented forces. When the electromagnets 1 and 2 are in a de-energized state, the armature 3 is maintained by the two resetting springs 5 and 7 in a position of equilibrium between the two electromagnets 1 and 2. By setting the bias of the opening spring 5 with the aid of non-illustrated setting means (such as a setscrew), the distance of the position of equilibrium from the two electromagnets 1 and 2 may be adjusted.

In the illustrated embodiment the solenoid 2.1 of the electromagnet 2 functioning as the opening magnet is energized, as a result of which the cylinder valve 6 is maintained in its open position against the force of the closing spring 7 by the magnetic field of the electromagnet 2.

Upon de-energization of the electromagnet 2 and upon energization of the electromagnet 1 (simultaneously or with a suitable delay) functioning as the closing magnet, the armature 3 is released from the pole face P2 of the electromagnet 2 and moves, urged first by the force of the closing spring 7, up to the mid position and thereafter, urged by the accelerating forces and the magnetic forces of the electromagnet 1, the armature 3 continues to move in the direction of the pole face P1 of the electromagnet 1.

Figure 2:
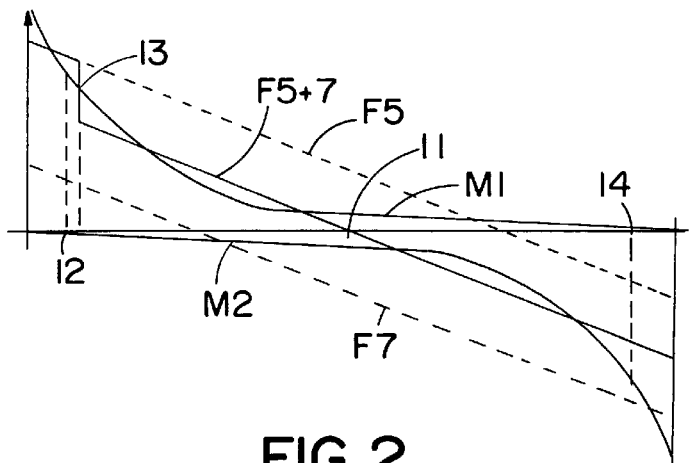
FIG. 2 is a diagram showing the magnetic and spring force curves as a function of the armature displacement in the method performed with the construction shown in FIG. 1.

The return spring 7 loses its force effect on the armature 3 as soon as the engine valve 6 assumes its closed position and thus the valve head engages the valve seat 6.1. Then the armature 3, by virtue of its kinetic energy and under the effect of the magnetic field moves against the force of the resetting spring 5 through a small distance corresponding to the axial clearance between the guide rod 4 and the valve stem 8, until it reaches its final position of engagement at the pole face P1. The course of the forces is illustrated in FIG. 2 where the magnet force of the electromagnet 1 is designated at M1, the force of the electromagnet 2 is designated at M2, the force of the opening spring 5 is designated at F5 and the force of the closing spring 7 is designated at F7. The spring characteristic curve F5+7 shows the resulting force of the two return springs 5 and 7. The curve portion 13 designates the "force jump" upon closing the engine valve.

As it has been described earlier in conjunction with FIG. 1, upon de-energization of the electromagnet 2 the armature 3 is first exposed practically only to the resetting force F7 of the closing spring 7. When the armature 3 passes through the location 11 where between the force F7 of the closing spring 7 and the force F5 of the opening spring 5 an equilibrium prevails, the kinetic energy drives the armature 3 beyond the location 11. Since in the meantime the capturing electromagnet 1 is energized, the armature 3 arrives in the zone of the magnetic field (which is under build-up) and is, by means of the magnetic force M1 moved further in the direction of the pole face P1 of the capturing electromagnet 1 against the resetting force F5 of the resetting spring 5. The exponentially increasing magnet force M1 accelerates the armature 3 until it impacts on the pole face P1 at location 12.

As may be observed in FIG. 2, the course of the forces affecting the armature 3 indicates that shortly before the armature 3 engages the pole face P1 at location 13, a position of equilibrium is reached between the magnetic force M1 and the spring force F5 of the return spring 5 which is the only effective spring at that time.

Figure 3:
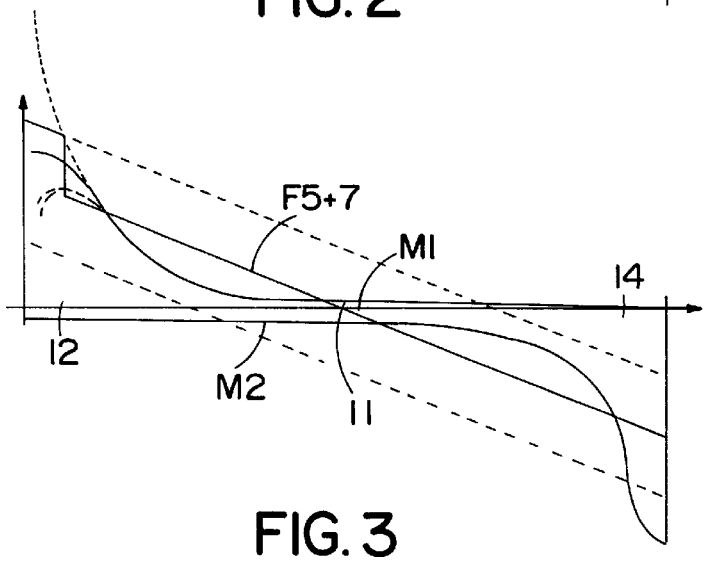
FIG. 3 is a diagram showing the magnetic and spring force curves as a function of the armature displacement in another preferred embodiment of the method, including a control of the electromagnetic forces.

As shown in FIG. 3 for the motion into the "valve closed" position, in the zone of the final armature approach to the pole face—in the present instance the pole face P1—the magnetic force pattern may be affected by control measures or by a suitable structural design of the capturing electromagnet and/or the armature 3. The dotted continuation of the curve M1 shows the magnetic force curve without saturation. The solid-line portion of the curve M1 in the region of the closed position shows, in turn, the course of the magnetic force having substantial saturation. The dash-dot portion of the curve M1 illustrates the course of the magnetic force when the energizing current is reduced in the region of the equilibrium position. This circumstance indicates that even in conventional electromagnetic actuators for cylinder valves a soft arrival of the armature at the pole face of the respective electromagnet may occur.

To ensure that in the course of the motion behavior as discussed above, the cylinder valve 6 engages the valve seat 6.1 in a soft manner, the actuator shown in FIG. 1 is provided with an additional spring 9 which engages, with the interposition of a spring seat disk 9.1, a supporting surface 10 forming part of a housing not shown in detail. The arrangement is designed such that upon the closing motion of the cylinder valve 6 the spring seat disk 7.1 of the closing spring 7 abuts the spring seat disk 9.1 of the additional spring 9 shortly before the cylinder valve 6 arrives into engagement with the valve seat 6.1.

Since upon motion of the armature 3 beyond the position of equilibrium the resetting force of the opening spring 5 becomes effective to oppose the magnetic force of the electromagnet 1 with a spring force determined by its spring characteristic, additionally to the resetting force of the return spring 5 the armature 3 is exposed to the force effect of the additional spring 9. As a result, a defined additional force effect is present which opposes the magnetic force while the latter progressively increases as the armature approaches the pole face.

Figure 4:
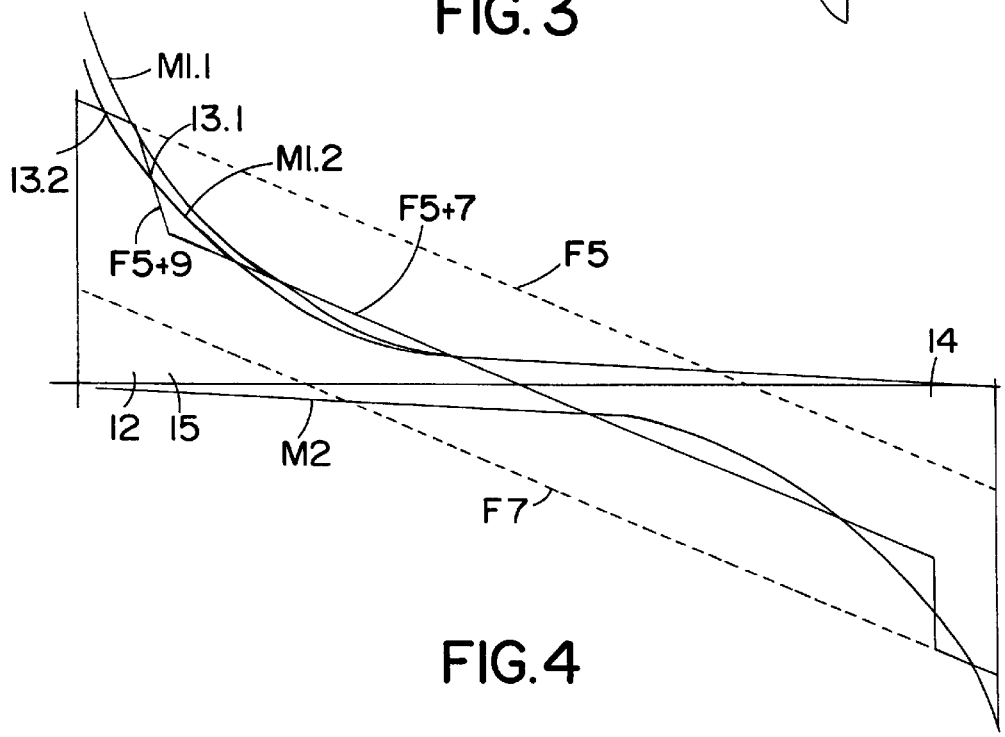
FIG. 4 is a diagram showing magnetic and spring force curves for different current intensities and using an additional spring.

As shown in FIG. 4, shortly before reaching the location 12, however, the valve 6 becomes operatively coupled to the spring 9 so that in addition to the resetting force F the armature 3 is exposed to the defined force component of the additional spring 9 in the opposite direction. Thus, shortly before the arrival of the valve 6 into the valve seat 6.1, that is, shortly before reaching the location 12, the armature 3 passes through a location 13 at which a force equilibrium between the magnetic force M1 on the one hand and the force F5+9 composed of the spring forces F5 and F9 prevails. By the defined force effect the armature 3 is braked in its motion.

The armature 3, for its displacement from the location of equilibrium 13 to its eventual closed position, has to be guided by a positive control of the current supplied to the capturing electromagnet 1 as it has been generally described in detail above.

If the capturing electromagnet 1 is energized with a higher current intensity, there is obtained a magnetic force curve M1.1. In this case the energizing current is so controlled that the point of the force equilibrium is identical with the location of the closed position of the valve.

If, however, the electromagnet 1 is energized with a lesser current as shown by the curve M1.2, there are obtained two stable points of equilibrium, that is, the points 13.1 and 13.2. It is seen from the spring force curve and the magnet force curve in the region between points 15 and 12, particularly between points 13 and 12 that by means of controlling the energization of the electromagnet 1 a positive guidance of the armature motion is feasible.

In the embodiment shown in FIG. 1, essentially one additional spring 9 is provided for the valve motion into the closed position so that, as shown in FIG. 2, upon motion into the open position, the conventional impacting conditions occur, that is, the armature 3, upon reaching the "valve open" position, impacts hard on the pole face P2 of the electromagnet 2 due to the large excess of the magnetic force M2 with respect to the force F7 of the resetting spring 7. If such an occurrence is to be avoided, the opening spring 5 too, is associated with an additional spring 9.2 as shown in dash-dot lines in FIG. 1. Since during the opening motion the only impacting occurs between the armature 3 and the pole face P2, the additional spring 9.2 may be designed differently from the additional spring 9.

Figure 5:
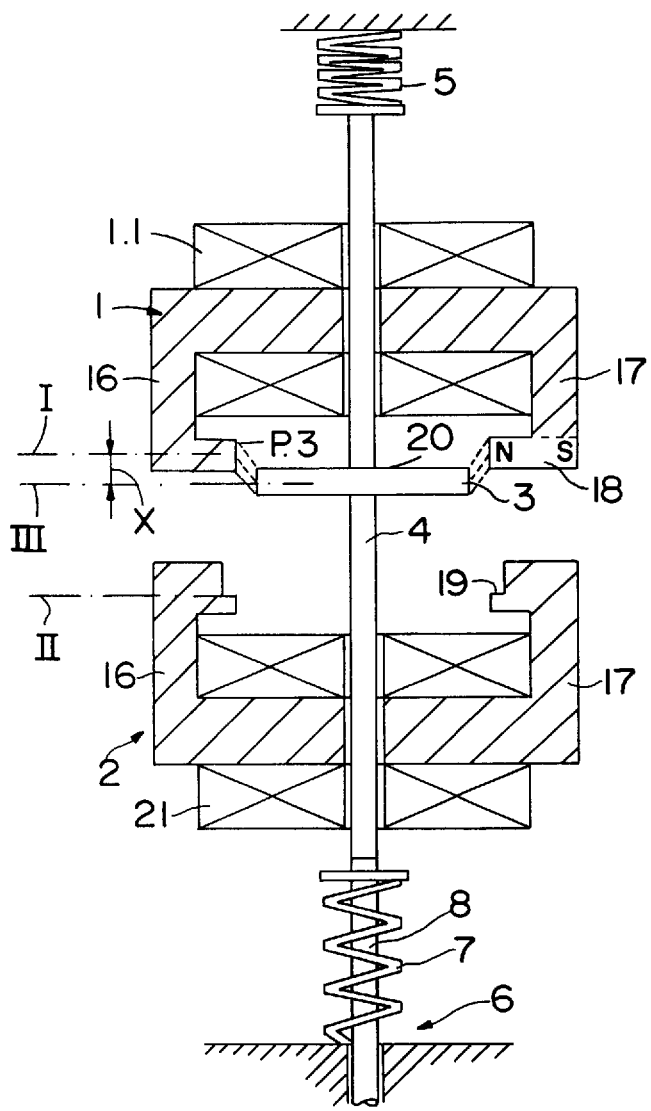
FIG. 5 is a schematic axial sectional view of an electromagnetic actuator for performing another preferred embodiment of the method according to the invention, where the armature is positioned in a contactless manner.

While, as described above, the method practiced with the electromagnetic actuator of FIG. 1 applies an additional force by the spring 9, that is, by mechanical means, in the construction according to FIG. 5 the additional force is generated by magnetic means. The basic construction of the electromagnetic actuator of the embodiment shown in FIG. 5 generally corresponds to that of the actuator shown in FIG. 1.

The two electromagnets 1 and 2 are substantially of identical construction; they each have two lateral pole shoes 16 and 17 whose pole faces (such as P3) are oriented in a direction perpendicular to the actuator axis A, so that when a magnetic field is generated by the energization of the respective electromagnet, the magnetic field is oriented substantially perpendicularly to the actuator axis A and thus to the direction of motion of the armature 3. The resetting force of the opening spring 5 on the one hand and the force of the magnetic field of the electromagnet 1 on the other hand are so dimensioned that in the shown closed position the armature 3 assumes a position in which it is situated slightly lower than the height level of the two pole faces 11. As shown by the symbolically illustrated field lines, in the illustrated position a magnetic residual force remains which acts in the closing direction; the force equilibrium is, however, so selected that the lower end of the guide rod 4 does not lift off the upper end of the valve shaft 8.

Upon de-energizing the coil 1.1 of the electromagnet 1, the armature 3 moves under the force of the compressed opening spring 5 towards the electromagnet 2. Upon energization of the coil 2.1 of the electromagnet 2, for example, at the moment when the armature traverses the mid position, the armature 3 is exposed to the magnetic field of the electromagnet 2 and is, as a result, pulled into the "valve open" position in between the two pole faces of the electromagnet 2 and is held in that position against the force of the closing spring 7, so that the cylinder valve 6 is maintained in its open position.

For supporting the electromagnetic holding force, a permanent magnet may be arranged at the pole shoe 16 and/or 17 of the electromagnets 1 and/or 2 and co-oriented with the electromagnetic field of the energized electromagnets 1 and 2. FIG. 5 shows one permanent magnet 18 attached to the pole face of the pole shoe 17 of the electromagnet 1 and forming the radially inwardly directed leg thereof. By virtue of the magnetic force of such permanent magnet or magnets, the magnetic field of the electromagnets 1 and/or 2 is reinforced in the holding position, so that a lower current intensity is required for holding the armature 3.

As seen in FIG. 5, the armature 3 may move further beyond its respective end position without impacting the pole face, in case the velocity of the armature is greater than zero when the end position is reached. The flat force pattern achieved by the orientation of the magnetic field in the vicinity of the desired end position permits a soft armature approach which may be controlled by regulating the current of the capturing electromagnet.

In the illustrated embodiment the armature 3 is a circular disk-shaped component and the pole faces P3 are of hollow cylindrical shape. The air gap between the outer periphery of the armature 3 and the pole faces P3 is 0.1 mm at the most. Such a small air gap ensures that the required holding current may be maintained at a practical magnitude. By virtue of the circular design of the armature 3 it is ensured that the torsional armature motions caused by the return springs 5 and 7 have no effect on the operation and free mobility of the armature 3. By arranging a step 19 on the pole faces, one part of the magnetic field may be oriented in a direction towards the mid position so that the capturing magnetic force has an earlier effect on the armature 3 as it approaches the capturing electromagnet 2.

The actuator illustrated in FIG. 5 may be modified such that the electromagnet which holds the armature 3 in the closed position has a conventional construction, that is, its pole face is oriented towards the surface 20 of the armature 3 so that—as heretofore—the armature is held in contact with the pole face of the electromagnet. Although noise generation upon impacting of the armature on the pole face will occur, the required holding current, however, may be reduced.

Figure 6:
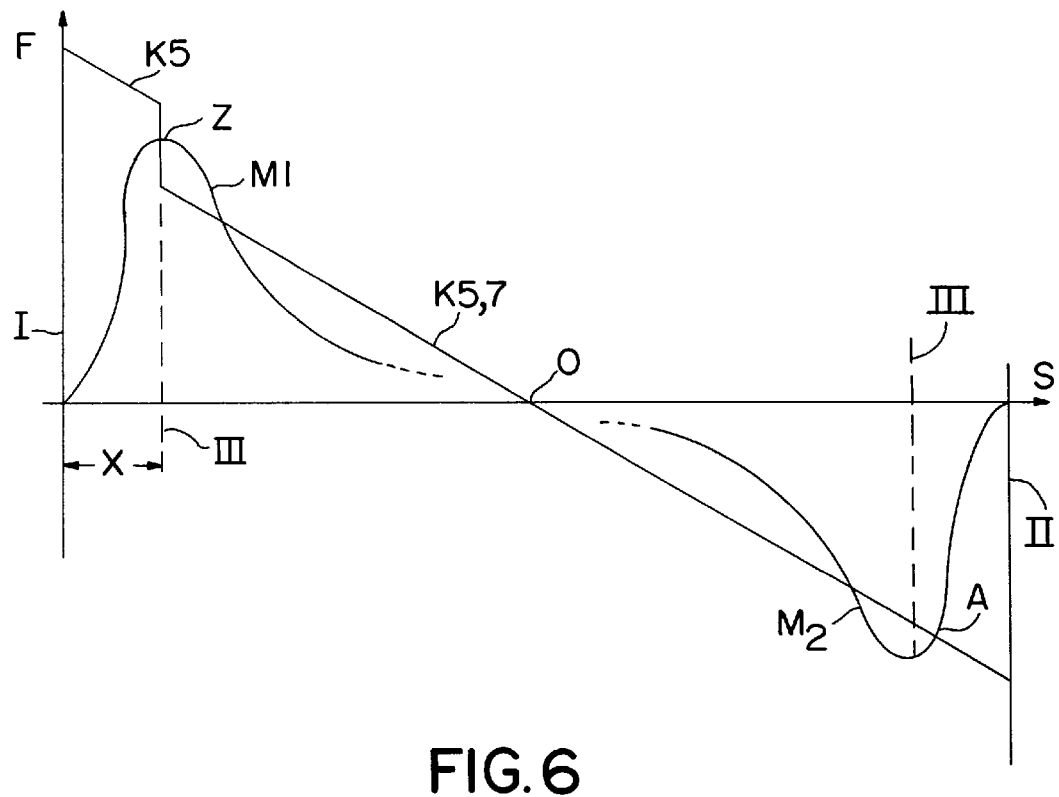
FIG. 6 is a diagram showing the magnet and spring force curves as a function of the armature displacement for a method practiced with the actuator illustrated in FIG. 5.

FIG. 6 illustrates the forces F acting on the armature 3 as a function of the armature displacement s. The curve $M_1$ represents the magnetic force of the electromagnet 1 from the effective plane I toward the armature 3, while the curve $M_2$ represents the magnetic force of the electromagnet 2 from the effective plane II, in the opposite direction toward the armature 3. Starting from the position of equilibrium 0 of the forces of the return springs 5 and 7, directed oppositely to one another across the point of equilibrium 0, on opposite sides of the abscissa s a practically linear spring characteristic $K_{5,7}$ is obtained which exerts a force on the armature 3 dependent upon its momentary position from the point of equilibrium 0.

In the "valve closed" position of the closing magnet 1 the characteristic curve for the spring force has a "jump" caused by the fact that after the valve 6 is seated, only the opening spring 5 can act on the armature 3, while the closing spring 7 holds the valve 6 firmly against its seat.

A comparison between the magnet force curves on the one hand and the spring force curves on the other hand show that a position of equilibrium is given for the "valve closed" position at the peak Z of the magnet force curve $M_1$ and for the "valve open" position in the point of intersection A between the spring curve K and the magnet force curve $M_2$. The distance between the two positions of equilibrium equals the valve stroke. The distance x between the central plane III of the armature shown in FIG. 5 and the central plane I of the pole faces of the electromagnet 1 indicates the position of the armature 3 in the position of equilibrium in the "valve closed" position. Likewise, the "valve open" position is determined by the distance of the mid plane III of the armature 3 to the mid plane II of the pole faces of the electromagnet 2.

It is seen from FIG. 6 that in the region of the point Z and the point A the magnet force is greater than the spring force so that a displacement of the armature from either end position under the effect of external impact forces is practically not possible and therefore an unintentional closing or opening of the cylinder valve in response to such external forces is reliably prevented.

By means of a suitable control of the current supply to the electromagnets 1 and 2 the course of the curves $M_1$ and $M_2$ may be altered.

Figure 7:
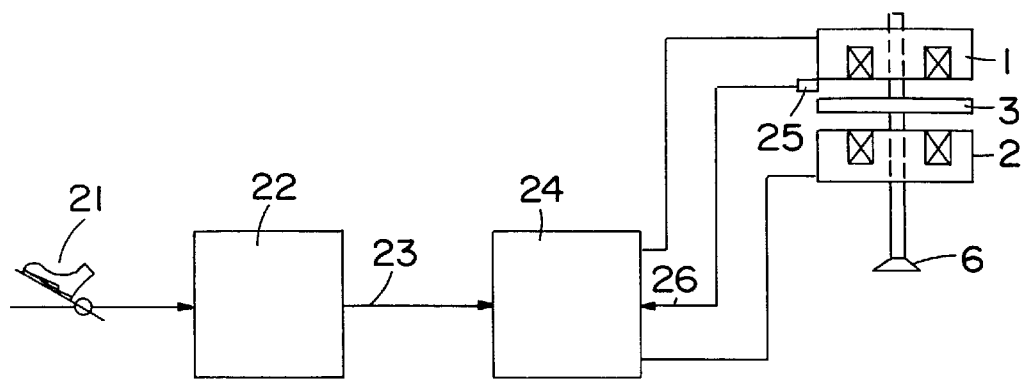
FIG. 7 is a block diagram for performing the method according to the invention.

FIG. 7 shows a block diagram illustrating the control of the electromagnetic actuators in a piston-type internal-combustion engine. For the sake of simplicity the circuit is shown only for a single one of a plurality of actuators present in the engine. The engine is controlled conventionally by a driver-operated gas pedal 21 whose setting signal is applied to an electronic engine control apparatus 22 by means of which, dependent upon the momentary operational data (such as engine rpm, coolant temperature, etc.), the individual functions of the engine are conventionally controlled, including the operation of the engine valves. For this purpose control signals 23 are applied by electronic engine control apparatus 22 to a current regulator 24 which controls the electromagnets 1 and 2 of the electromagnetic actuators for operating the engine valves 6.

In the described embodiment a path sensor 25 is associated at least with the electromagnet 1 operating as the closing magnet for detecting the approach of the armature 3 to the pole face P1, so that by means of a corresponding signal 26 the earlier-described current regulation may be effected in order to bring the armature 3 smoothly into engagement with the pole face P1 from the point of the equilibrium between the resetting forces and the magnetic force.

FIGS. 8.1 and 8.2 schematically show different magnet configurations by means of which the position of the force equilibrium for the armature may be affected. While according to the embodiment shown in FIG. 5 the armature does not engage the pole faces, the configurations in FIGS. 8.1 and 8.2 are so designed that the magnetic forces in the last phase of approach to the pole face allow an increase of influence of the force, so that by means of a positive guidance of the current flow through the capturing electromagnet a soft but secure arrival of the armature on the pole face is ensured.

FIGS. 8.3 and 8.4 show magnet configurations in which a force pattern is achieved which, when the armature arrives in the immediate vicinity of the pole faces, results in a weakening of the force. In this manner a stable position of equilibrium without additional springs may be achieved in the vicinity of the pole faces. In the magnet configurations of FIGS. 8.1–8.4 the desired effect is achieved in each instance by variously configured pole shoe "horns" 2.2 projecting beyond the pole faces.

It will be understood that the above description of the present invention is susceptible to various modifications, changes and adaptations, and the same are intended to be comprehended within the meaning and range of equivalents of the appended claims.

What is claimed is:

1. A method of operating a cylinder valve of an internal-combustion engine with an electromagnetic actuator for moving the cylinder valve into opposite open and closed valve end positions; the method comprising the steps of (a) energizing an electromagnet of the actuator for generating an electromagnetic force for moving an armature of the actuator toward a pole face of the electromagnet against the force of a return spring;

(b) after the armature enters a zone adjacent the pole face of the electromagnet, applying to the armature an additional force opposing the electromagnetic force of the electromagnet;

(c) dimensioning the additional force such that an equilibrium between the electromagnetic force of the electromagnet and the increased opposing force of the return spring is situated at a location shortly before the armature enters into engagement with the pole face of the electromagnet; and (d) after the armature reaches the location of force equilibrium, controlling a current supply to the electromagnet such that the armature reaches the pole face of the electromagnet with a predeterminable velocity.

2. The method as defined in claim 1, wherein step (b) comprises the step of applying a spring force as said additional force.

3. The method as defined in claim 2, wherein step (b) comprises the step of applying a spring force of an additional spring.

4. The method as defined in claim 2, wherein step (b) comprises the step of applying a spring force of return spring having a progressive spring characteristic curve at least in an end region of a motion path of said armature.

5. The method as defined in claim 1, wherein step (b) comprises the step of applying magnetic forces to said armature.

6. The method as defined in claim 1, wherein step (b) comprises the step of applying magnetic forces to said armature by shaping a force/displacement course of magnetic forces generated by said electromagnet.

7. The method as defined in claim 1, wherein said electromagnet is a holding magnet for maintaining the cylinder valve in the closed position; further wherein step (a) comprises the steps of directing the electromagnetic field of said electromagnet and controlling the current supply to said electromagnet such that in the closed end position of the cylinder valve the armature is held in the armature end position at said electromagnet against the spring force and out of contact with the pole faces of said electromagnet.

8. The method as defined in claim 7, wherein the step of directing the electromagnetic field comprises the step of directing the electromagnetic field substantially perpendicularly to the direction of the armature motion.

9. The method as defined in claim 7, wherein said step of controlling the current supply comprises the step of reducing the current supplied to said electromagnet shortly before the armature reaches the armature end position at said electromagnet.

10. The method as defined in claim 7, further comprising the steps of directing the magnetic force of a permanent magnet to said armature in the armature end position thereof at said electromagnet codirectionally with the electromagnetic force of one electromagnet and dimensioning the magnetic force of said permanent magnet such as to be less than the spring force opposing the electromagnetic force applied to said armature in said armature end position.

* * * * *